United States Patent
Mattaliano

(10) Patent No.: US 10,995,713 B2
(45) Date of Patent: May 4, 2021

(54) SYSTEMS AND METHODS FOR PRIMING A FUEL FILTRATION HOUSING

(71) Applicant: Will Mattaliano, Palm Beach Gardens, FL (US)

(72) Inventor: Will Mattaliano, Palm Beach Gardens, FL (US)

(*) Notice: Subject to any disclaimer, the term of this patent is extended or adjusted under 35 U.S.C. 154(b) by 170 days.

(21) Appl. No.: 16/276,856

(22) Filed: Feb. 15, 2019

(65) Prior Publication Data

US 2020/0261831 A1    Aug. 20, 2020

(51) Int. Cl.

| F02M 37/16 | (2006.01) |
| F02M 37/42 | (2019.01) |
| B01D 35/26 | (2006.01) |
| B01D 35/30 | (2006.01) |

(52) U.S. Cl.
CPC ............. *F02M 37/16* (2013.01); *B01D 35/26* (2013.01); *B01D 35/30* (2013.01); *F02M 37/42* (2019.01); *B01D 2201/302* (2013.01); *B01D 2201/304* (2013.01)

(58) Field of Classification Search
CPC ........ B01D 35/26; B01D 35/30; F02M 37/44; F02M 37/16; F04B 9/14
See application file for complete search history.

(56) References Cited

U.S. PATENT DOCUMENTS

| 3,500,759 | A | * | 3/1970 | Parks | .............. | F02M 1/16 |
| | | | | | | 417/534 |
| 4,437,986 | A | * | 3/1984 | Hutchins | ............. | B01D 17/045 |
| | | | | | | 210/130 |
| 5,692,632 | A | * | 12/1997 | Hsieh | .................... | B65D 81/20 |
| | | | | | | 215/228 |
| 5,868,931 | A | * | 2/1999 | Janik | ................... | F02M 37/16 |
| | | | | | | 210/416.4 |
| 7,389,629 | B2 | * | 6/2008 | Tretina | ................. | F04C 25/00 |
| | | | | | | 141/65 |
| 2016/0257475 | A1 | * | 9/2016 | Gervais | .............. | B65D 43/0214 |
| 2018/0169549 | A1 | * | 6/2018 | Pribanic | ................ | B01D 35/26 |
| 2018/0273274 | A1 | * | 9/2018 | Ho | .......................... | A47J 47/10 |

* cited by examiner

*Primary Examiner* — Timothy P. Kelly
(74) *Attorney, Agent, or Firm* — Rothwell, Figg, Ernst & Manbeck, P.C.

(57) ABSTRACT

Systems and methods for priming a fuel filtration housing are provided. In some embodiments, a system for filling a fuel filtration housing may include a cover sized and shaped to releasably engage an opening to a first chamber of a first fuel filtration housing, a first seal coupled to the cover, and a pump. In some embodiments, the cover, the first seal, and the pump may be arranged such that when the cover is pressed against the opening of the first fuel filtration housing and the pump is operated, the first seal engages one or more surfaces of the first fuel filtration housing and a first low pressure zone is formed within the chamber of the first filtration housing. The first low pressure zone may have a pressure that is lower than a pressure within a first fuel supply tank coupled to the first chamber such that a first liquid within the first supply tank flows into the first chamber.

18 Claims, 5 Drawing Sheets

SYSTEMS AND METHODS FOR PRIMING A FUEL FILTRATION HOUSING

FIELD OF THE DISCLOSURE

This disclosure relates to systems and methods for filling a filtration housing with fuel.

BACKGROUND

Many types of diesel powered machines (including but not limited to boats, generators, heavy equipment, etc.) are equipped with fuel systems that utilize a water separation and fuel filtration housing. These housings may include a removable filtration element. During the normal maintenance of these housings, it may be necessary to replace filtration elements and/or to drain contaminated fuel/water from the housings. In either case, the filter housing may be left empty or only partially full of fuel, and it may need to be filled with liquid (e.g., fuel) to complete the service.

The standard process for filling a filtration housing is through the use of a portable fuel jug. This process is slow and presents a number of difficulties. One problem is that the filtration housing is often installed in an area that has difficult or limited access. The access may dictate that only a small container can be used for filling, which then requires transferring fuel from the large jug to a smaller one. A complete fuel filtration housing service may require nearly five gallons of fuel, necessitating multiple transfers from the large jug to the smaller one. Another problem, attributed to the limited access of the filtration housings, is that the process of pouring fuel into the housing is often a physically awkward one, which leads to wasteful and messy fuel spills. Also, the standard method of using a portable fuel jug requires that the jug be stored in close proximity to the engines taking up valuable space. Additionally, the jug must be filled separately from the fuel tank that serves the engine, which is often forgotten during normal fuel fill-ups, leading to extra trips to a fuel filling station.

Accordingly, there is a need for systems and methods to address these and other challenges, as described more fully below.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In some embodiments, a system for filling a fuel filtration housing may be provided. The system may include a cover sized and shaped to releasably engage an opening to a first chamber of a first fuel filtration housing. The cover may have a hole therethrough such that air may pass from a first side of the cover through the hole to a second side of the cover opposite the first side. The system may further include a first seal coupled to the cover. In some embodiments, the first seal may be arranged such that when the cover is pressed against the opening of the first fuel filtration housing, the first seal engages one or more surfaces of the first fuel filtration housing. The system may include a pump which may be pneumatically coupled to the hole in the cover. The cover, the first seal, and the pump may be arranged such that when the cover is pressed against the opening of the first fuel filtration housing and the pump is operated, the first seal engages one or more surfaces of the first fuel filtration housing and a first low pressure zone is formed within the chamber of the first filtration housing. The first low pressure zone may have a pressure that is lower than a pressure within a first fuel supply tank coupled to the first chamber such that a first liquid within the first supply tank flows into the first chamber.

In some embodiments, the system may further include a second seal coupled to the cover. The second seal may be arranged such that when the cover is pressed against an opening to a second chamber of a second fuel filtration housing having a size or shape that is different than the opening of the first fuel filtration housing, the second seal engages one or more surfaces of the second fuel filtration housing. In some embodiments, the cover, second seal, and pump may be arranged such that when the cover is pressed against the opening of the second fuel filtration housing and the pump is operated, the second seal engages one or more surfaces of the second fuel filtration housing and a second low pressure zone is formed within the chamber of the second filtration housing. The second low pressure zone may have a pressure that is lower than a pressure within a second fuel supply tank coupled to the second chamber such that a second liquid within the second supply tank is caused to flow into the second chamber.

In some embodiments, the first seal and the second seal may be disposed in a common plane, and the second seal is circumscribed by the first seal. In some embodiments, a first interior area defined by the first seal may have a first centroid, and a second interior area defined by the second seal may have a second centroid located at a different position than the first centroid. In some embodiments, the hole in the cover may be closer to the second centroid than the first centroid. In some embodiments, the cover may have a planar surface with a first groove and a second groove, the first seal may be at least partially disposed within the first groove, and the second seal may be at least partially disposed within the second groove.

In some embodiments, the cover may be at least partially transparent such that when the cover is pressed against the opening of the first fuel filtration housing and the first seal engages the one or more surfaces of the first fuel filtration housing, a fill level of the first liquid within the first chamber can be seen by looking through the cover.

In some embodiments, the system may include an overflow reservoir, which may be arranged to receive liquid output from the pump. The overflow reservoir may have a first port that is pneumatically coupled to the pump and a second port that is open to atmosphere. The second port may disposed on the overflow reservoir such that when the cover is pressed against the opening of the first fuel filtration housing—the opening being disposed in a plane perpendicular to gravity—and the pump is operated such that the first liquid fills the first chamber and flows through the hole in the cover, through the pump, and into the overflow reservoir, at least half of an internal volume of the reservoir will be filled with the first liquid before the first liquid overflows through the second port.

In some embodiments, the pump may be mechanically coupled to the cover via a pneumatic coupling at the hole in the cover. The hole may be disposed at a first end of the cover. The pump may be further mechanically coupled to the cover via a mounting stand, which may be disposed at a second end of the cover opposite the first end. In some embodiments, these two connections may be the only points at which the pump is mechanically coupled to the cover. In some embodiments, the system may be no longer than two feet in any dimension. In some embodiments, the system may weigh less than five pounds.

A method for filling at least one fuel filtration housing may be provided. The method being performed using a device comprising a cover, a first seal coupled to the cover, and a pump pneumatically coupled to a hole in the cover. The device may additionally or alternatively include any of the structural elements described herein. In some embodiments, the method may include pressing the cover by hand against an opening to a first chamber of a first fuel filtration housing, wherein pressing the cover by hand against the opening of the first fuel filtration housing causes the first seal to engage one or more surfaces of the first fuel filtration housing. In some embodiments, the method may include operating the pump while the cover is pressed by hand against the opening of the first fuel filtration housing, thereby forming a first low pressure zone within the first chamber. In some embodiments, forming the first low pressure zone within the first chamber may cause a first liquid within a first supply tank to flow into the first chamber.

In some embodiments, the method may include removing the cover from the first filtration housing and pressing the cover by hand against an opening to a second chamber of a second fuel filtration housing. The opening of the second fuel filtration housing may have a different size or shape than the opening of the first fuel filtration housing. Pressing the cover by hand against the opening of second fuel filtration housing may cause a second seal that is coupled to the cover to engage one or more surfaces of the second fuel filtration housing. The method may include operating the pump while the cover is pressed by hand against the opening of the second fuel filtration housing, thereby forming a second low pressure zone within the second chamber. In some embodiments, forming the second low pressure zone within the second chamber may cause a second liquid within a second supply tank to flow into the second chamber.

In some embodiments, the first seal and the second seal may be disposed in a common plane, and the second seal may circumscribed by the first seal. In some embodiments, a first interior area defined by the first seal may have a first centroid, and a second interior area defined by the second seal may have a second centroid. The first and second centroids may be located at different positions, and the hole in the cover is closer to the second centroid than the first centroid.

In some embodiments, the cover may include a planar surface having a first groove and a second groove. The first seal may be at least partially disposed within the first groove, and the second seal may be at least partially disposed within the second groove.

In some embodiments, the cover may be at least partially transparent, and the method may further include looking though the cover while the cover is pressed against the opening of the first fuel filtration housing to see a fill level of the first liquid within the first chamber, determining that the first chamber is full, and ceasing operation of the pump in response to determining that the first chamber is full.

In some embodiments, operating the pump may cause air to flow out of the pump through an overflow reservoir that is arranged to receive liquid output from the pump. In some embodiments, the overflow reservoir may have a first port that is pneumatically coupled to the pump and a second port that is open to atmosphere. The opening of the first fuel filtration housing may be disposed in a plane perpendicular to gravity. In some embodiments, the method may further include operating the pump until the first liquid fills the first chamber and flows through the hole in the cover, through the pump, and into the overflow reservoir. In some embodiments, the second port may be arranged on the overflow reservoir such that at least half of an internal volume of the reservoir must be filled with the first liquid before the first liquid overflows through the second port.

In some embodiments, the pump may be mechanically coupled to the cover via a pneumatic coupling at the hole in the cover. The hole may be disposed at a first end of the cover. The pump may be further mechanically coupled to the cover via a mounting stand, which may be disposed at a second end of the cover opposite the first end. In some embodiments, these two connections may be the only points at which the pump is mechanically coupled to the cover. In some embodiments, the system may be no longer than two feet in any dimension. In some embodiments, the system may weigh less than five pounds.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

Figure 1:
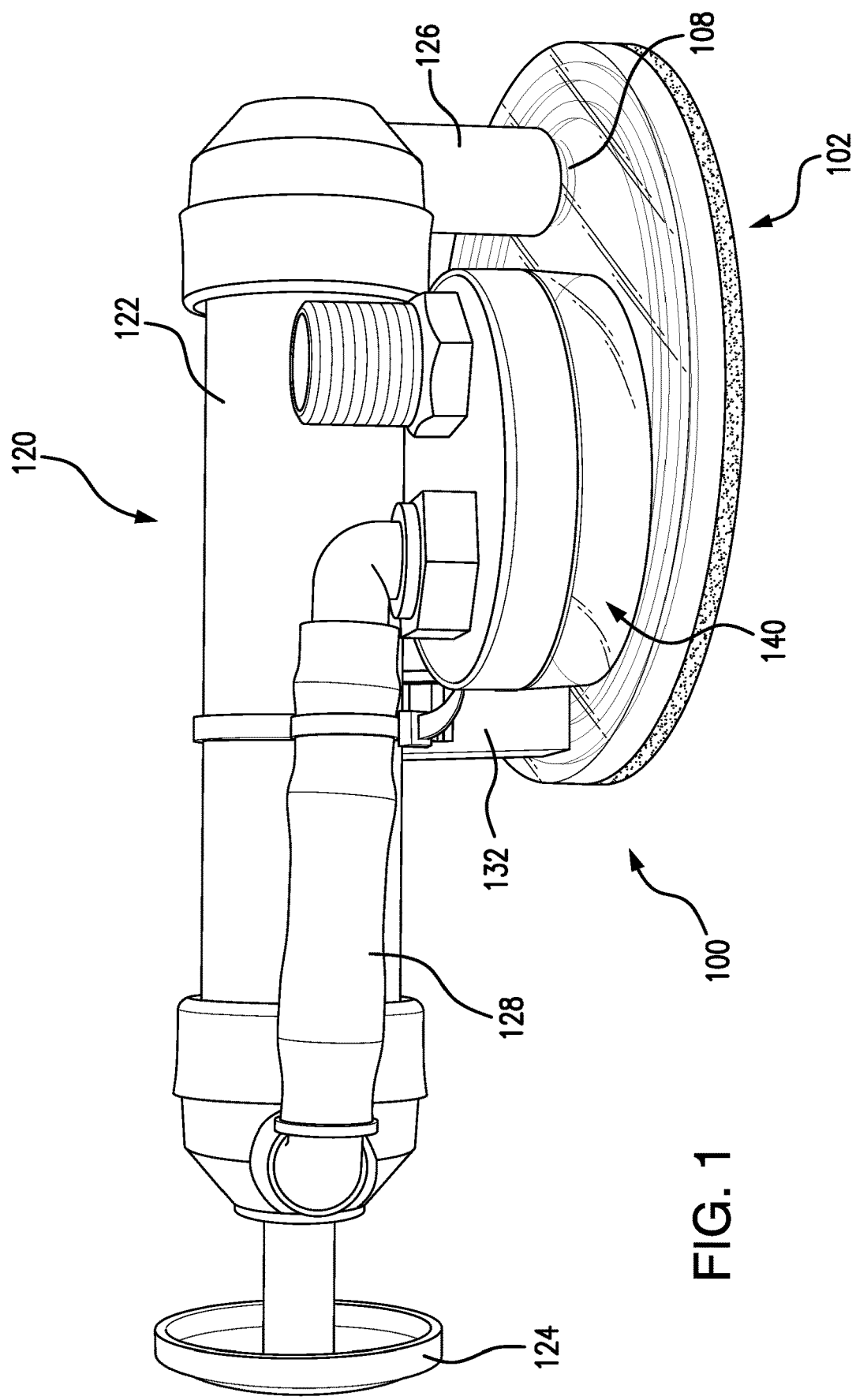
FIG. 1 depicts an exemplary embodiment of a system for filling a fuel filtration housing.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, expressly recited in the claims, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

FIG. 1 illustrates an exemplary embodiment of a system 100 for filling a fuel filtration housing. The system 100 may include a cover 102, a pump 120, and an overflow reservoir 140. The pump 120 in the illustrated embodiment is hand-operated. In other embodiments, the pump may be powered, for example, by batteries. In a hand-operated embodiment, the pump 120 may include a plunger 124 arranged to be operated by a user's hand.

The pump 120 may include a pump body 122, an input conduit 126, and an output conduit 128. The input conduit 126 may pneumatically connect between a hole 108 in the cover 102 and the pump body 122. The input conduit 126 may form a substantially airtight connection with the hole 108 in the cover 102, for example, via a threaded pipe nipple that is screwed into the hole 108. The output conduit 128 may pneumatically connect between the pump body 122 and the overflow reservoir 140. The output conduit 128 and overflow reservoir 140, which are optional, may be used to contain excess fuel when filling a filtration housing. In embodiments where an overflow reservoir 140 is not provided, the output from the pump 120 may be flow directly to atmosphere, or it may pass through an output conduit to atmosphere or another receptacle or conduit. The pump 120 may be arranged such that when the pump is operated (e.g., via plunger 124), air or liquid flows in through the input conduit 126, through the pump body 122, and out through the output conduit 128.

In some embodiments, the pump 120 may be mechanically coupled to the cover 102 at two or more points. For example, the pump 120 may be mechanically coupled to the cover 102 by the input conduit 126. Optionally, the input conduit may include a threaded portion that may screw into corresponding threads in the hole 108 in the cover 102. The pump 120 may also be mechanically coupled to the cover 102 by a mounting stand 132. The input conduit 126 may contact the cover 102 at a first end of the cover, and the mounting stand 132 may contact the cover 102 at a second end of the cover opposite the first end. In this manner, the two contact points may be spaced by a majority of the distance of the cover, thereby improving the stability of the connection. In some embodiments, the mounting stand 132 may contact the pump body 122 approximately at a midpoint of the pump body 122 (e.g., within three inches of the midpoint of the pump body 122). In some embodiments, the cover may have a first length, and the pump body may have a second length that is approximately double the length of the cover. By placing the mounting stand approximately at a midpoint of the pump body 122, the weight of the pump may be substantially balanced about the mounting stand such that the weight of the pump applies little to no tension along the input conduit 126 when the system is placed with the cover 102 resting on a horizontal surface.

In some embodiments, the system 100 may be no longer than four feet in any dimension (including when a plunger of a hand-operated embodiment is extended). In some embodiments, the system 100 may be no longer than three feet, two feet, or one and a half feet in any dimension. In any of those embodiments—or other embodiments—the system may weigh less than seven pounds, five pounds, three pounds, two pounds, or one pound. The systems described herein are particularly advantageous in cases where it is inconvenient to fill a fuel filtration housing with a portable fuel container, for example, due to the housing being mounted in a remote location or the presence of space constraints in the area around which the housing is mounted. Some housings require five or more gallons of fuel but are mounted in a position where a five gallon container cannot reasonably reach. In cases like these, using a small and lightweight system, such as those described herein, to fill the housing provides a substantial advantage.

Figure 2:
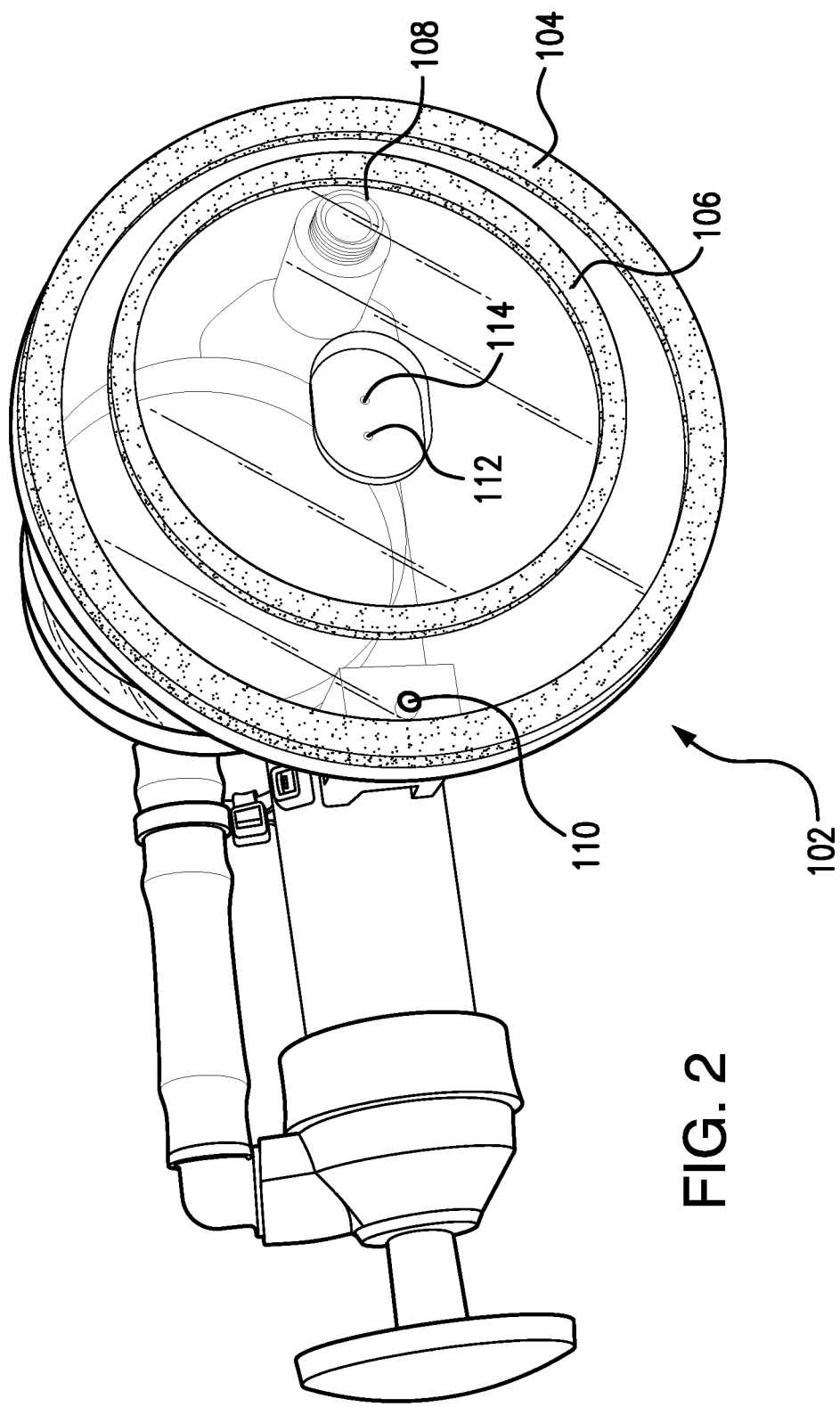
FIGS. 2-3 depict additional views of the system illustrated in FIG. 1.

FIG. 2 shows another perspective of the system 100 in which details of the cover 102 are visible. In some embodiments, the cover 102 may be transparent such that a fill level within a filtration housing may be observed by looking through the cover 102. For example, the cover 102 may be made of transparent acrylic.

As noted above, the cover 102 may include a hole 108 therethrough such that air may pass from a first side of the cover through the hole to a second side of the cover opposite the first side. In some embodiments, a first seal 104 may be coupled to the cover 102. The first seal 104 may have a size and shape that substantially matches a size and shape of an opening of a first filtration housing. For example, the first seal may be arranged such that when the cover is pressed against the opening of the first fuel filtration housing, the first seal engages one or more surfaces of the first fuel filtration housing. For example, the first seal may engage a surface disposed about the perimeter of the first housing opening. In some embodiments, the first seal may engage a top rim surface of the housing.

In some embodiments, a second seal 106 may be coupled to the cover 102. The second seal 106 may have a size and shape that substantially matches a size and shape of an opening of a second filtration housing that is sized or shaped differently than the first filtration housing. For example, the second seal may be arranged such that when the cover is pressed against the opening of the second fuel filtration housing, the second seal engages one or more surfaces of the second fuel filtration housing. For example, the second seal may engage a surface disposed about the perimeter of the second housing opening. For some applications, a user may need to fill two filtration housings having different sizes or shapes. For example, a boat will often have two engines having filtration housings of different shapes or sizes. If a user wishes to maintenance both engines, he or she will often need to fill both filtration housings. In such a scenario, the systems described herein offer substantial advantages relative to carrying portable fuel containers. Moreover, by providing a cover having two seals that match the different shapes of the filtration housings, it is possible to fill both housings using a single device.

In some embodiments, the cover 102 may have a first groove and the first seal 104 may be at least partially disposed within the first groove. In some embodiments, the cover 102 may have a second groove and the second seal 106 may be at least partially disposed within the second groove. In some embodiments, the first seal and the second seal may be disposed in a common plane. For example, the cover 102 may include a substantially planar surface to which both the first and second seal are attached. In some embodiments, the second seal may be circumscribed by the first seal. In this manner, the two seals may be arranged to engage housings of different sizes without interfering with one another, while at the same time, the size of the cover may be minimized.

In some embodiments, the first seal 104 may define a first interior area having a first centroid 112, and the second seal 106 may define a second interior area having a second centroid 114. The first centroid 112 may be located at a different position than the second centroid 114. In some embodiments, the hole 108 may be closer to the second centroid 114 than the first centroid 112. This arrangement helps to minimize the length of the system 100, which makes the system easier to use in tight spaces. The hole 108 is preferably disposed within the interior area of both the first seal 104 and the second seal 106. At the same time, the hole is preferably disposed close to an edge of the cover 102, such that a portion of the pump body 122 overlying the cover 102 is maximized and a portion of the pump body 122 extending beyond the cover 102 is minimized. Given these constraints, it may be advantageous to place a portion of the perimeter of the second seal 106 near an edge of the cover 102, thereby extending the interior area of the second seal 106 near that edge, and to also place the hole 108 near the same edge. In some embodiments, the first centroid 112, the second centroid 114, and the hole 108 may lie along a common line.

Figure 3:
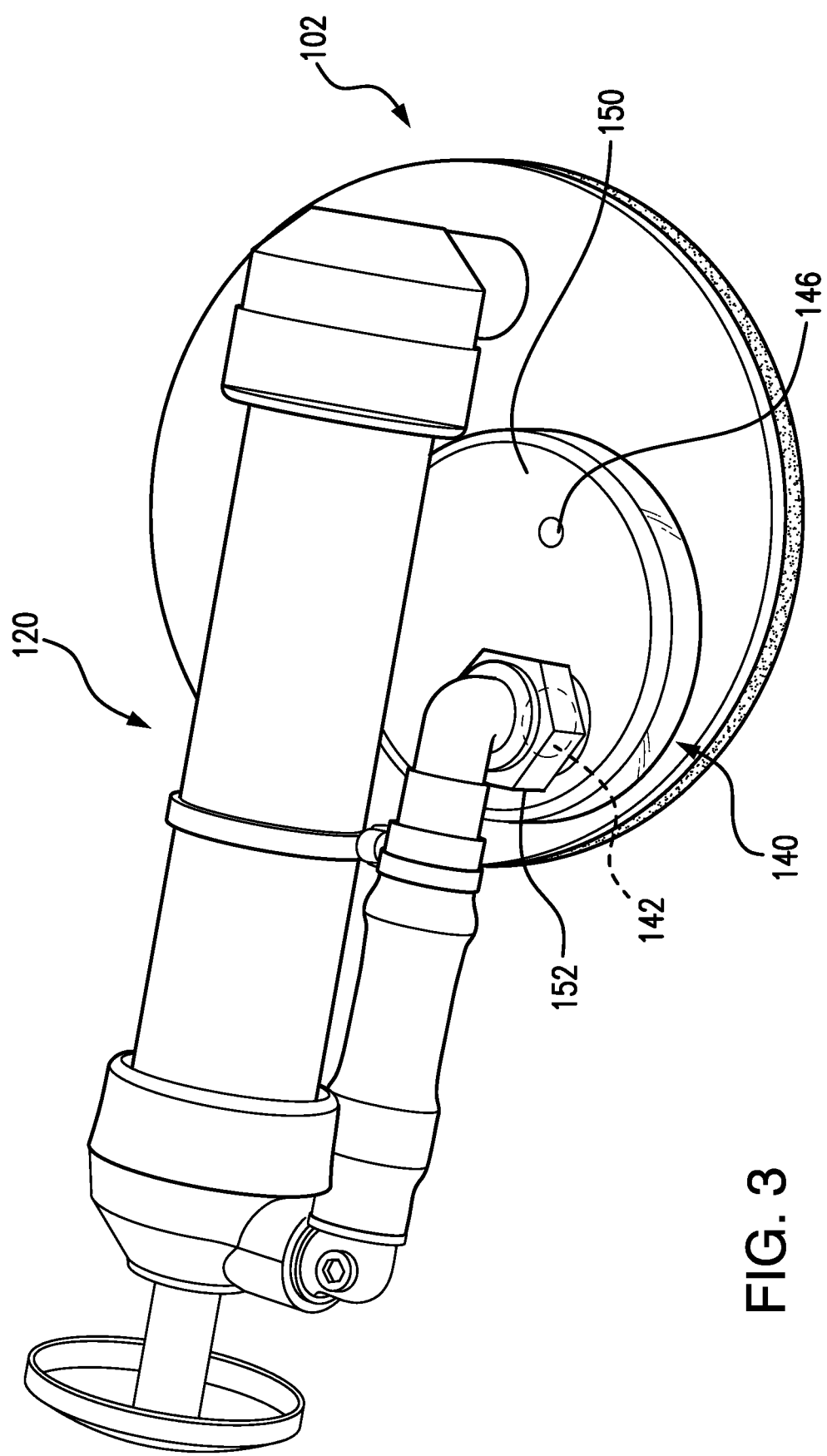

FIG. 3 shows another perspective of the system 100 in which details of the overflow reservoir 140 are visible. When filling a filtration housing, it is possible to have some liquid (e.g., fuel) overflow. In such a case, the liquid may pass out of the hole 108, through the pump body 122, through the output conduit 128, and into an optional overflow reservoir 140. The overflow reservoir 140 may define an internal chamber configured to receive and hold such liquid. In some embodiments, the overflow reservoir may include a cup 148 and a lid 150, which may optionally have screw threads to engage one-another so that the reservoir may be opened and emptied or cleaned.

In some embodiments, the overflow reservoir 140 may have a first port 142 and a second port 146. In some embodiments, the first port 142 may be pneumatically coupled to the pump 120, for example, via the output conduit. In some embodiments, the output conduit may be attached to the first port 142 via a nut 152 that engages screw threads disposed on the first port 142. In some embodiments, the second port 146 may be open to atmosphere, either directly or indirectly. The second port 146 may optionally be disposed on a surface of the reservoir 140 that is disposed opposite the direction of the cover 102. In this manner, when the cover is placed on top over a horizontally arranged opening to a fuel filtration housing and fuel overflows into the reservoir 140, at least half of an internal volume of the reservoir will be filled before the fuel overflows through the second port 146. In some embodiments, the second port 146 may be placed such that at least seventy percent or at least ninety percent of the internal volume must be filled before liquid overflows through the second port.

Figure 4:
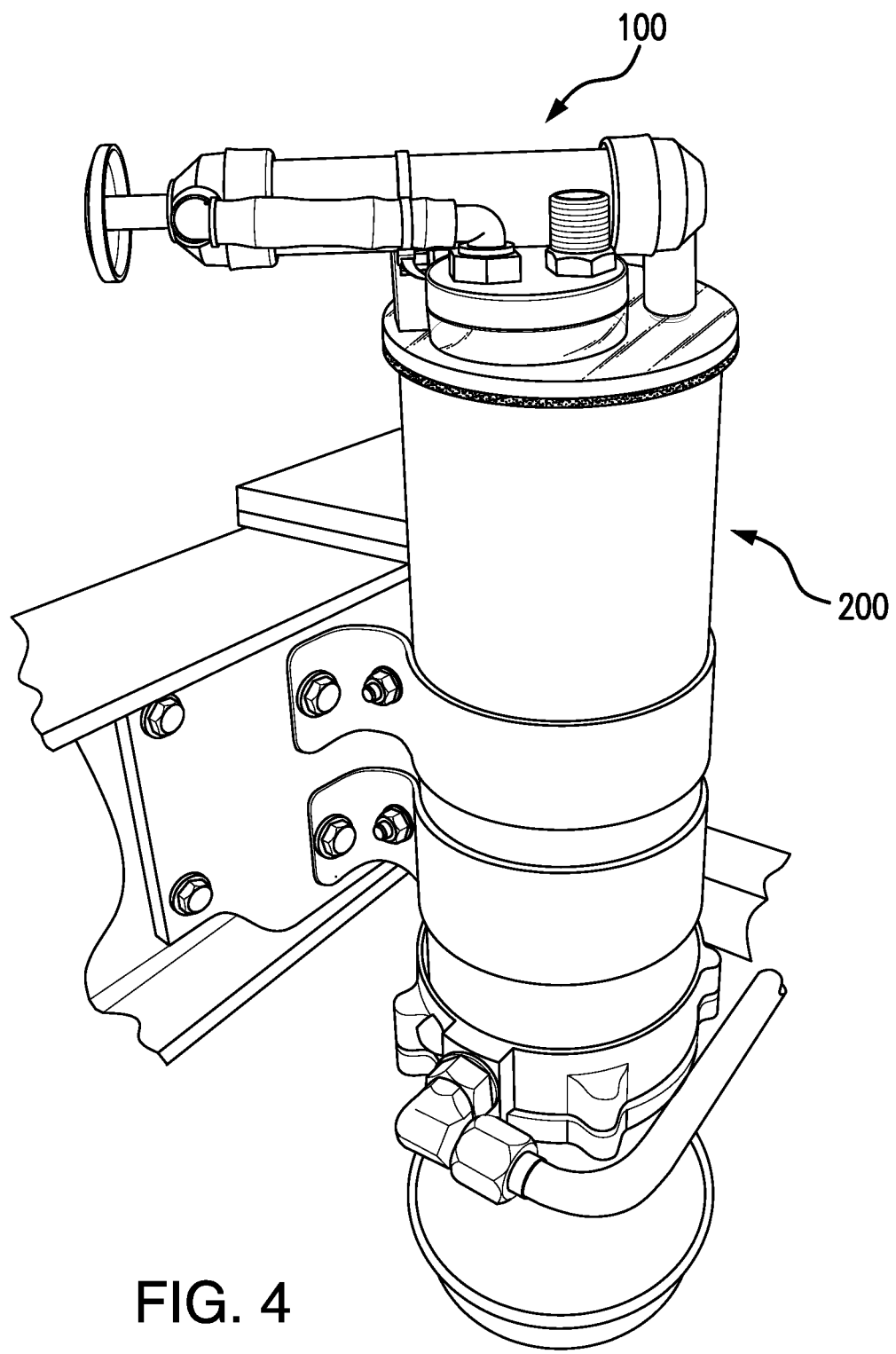
FIG. 4 depicts the system of FIG. 1 engaged to an exemplary fuel filtration housing.

FIG. 4 depicts the system 100 engaged to an exemplary fuel filtration housing 200. As illustrated in FIG. 4, the housing 200 may be substantially cylindrical and may have a substantially circular opening through which an internal chamber may be accessed. In some embodiments, the housing may have a non-circular cross-section, such as a square, triangle, rectangle, or other polygon. The system 100 may be placed against the opening to the fuel filtration housing such that the system 100 engages one or more surfaces (e.g., a rim surrounding the opening) of the housing 200. The pump may then be operated to create a low pressure zone within the chamber of the housing.

Figure 5:
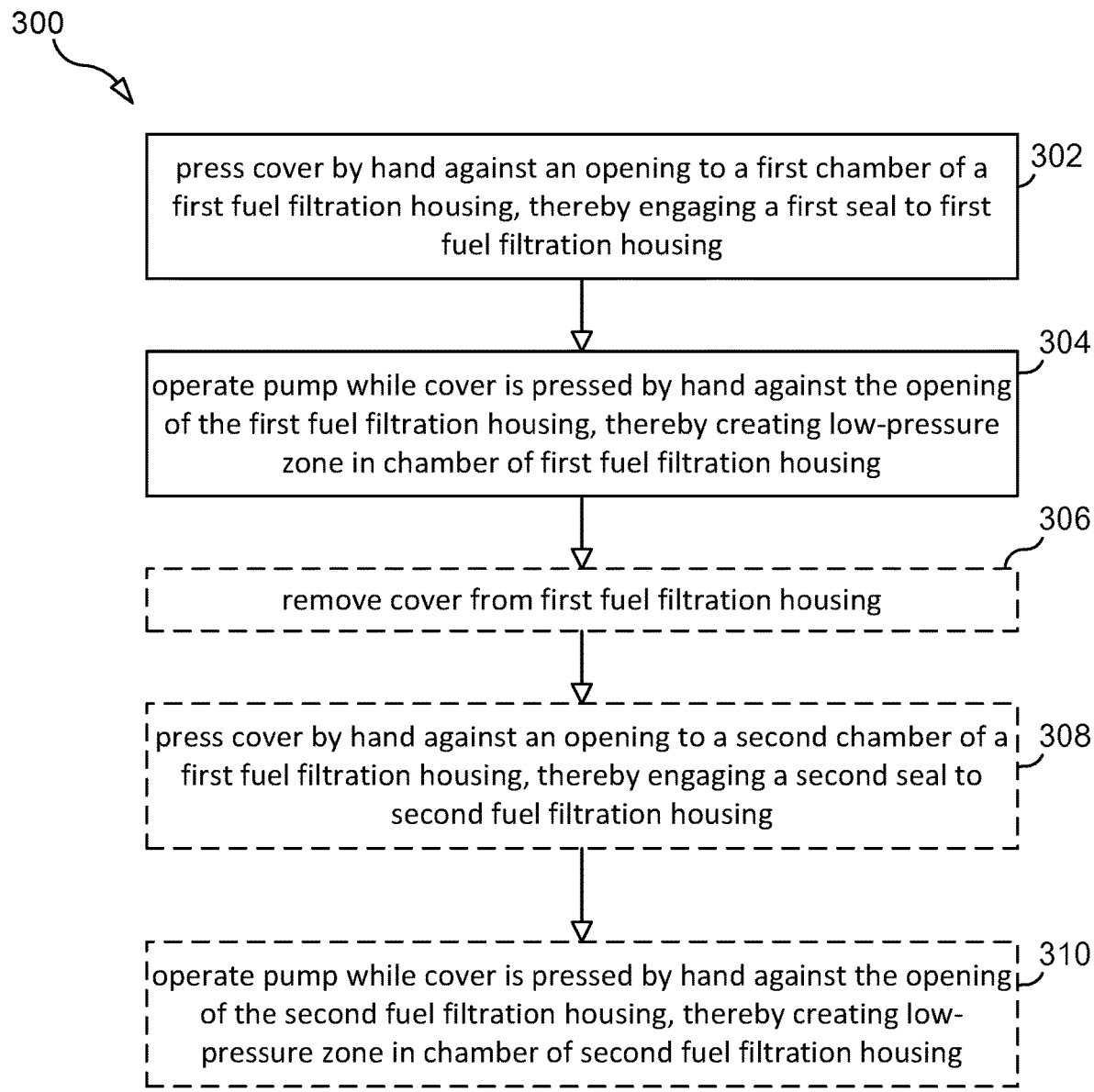
FIG. 5 shows an exemplary method for filling a fuel filtration housing.

FIG. 5 shows an exemplary method 300 for filling a fuel filtration housing. In some embodiments, the method 300 may be performed using a device including a cover, a first seal coupled to the cover, and a pump pneumatically coupled to a hole in the cover. For example, the method 300 may be performed using a device as illustrated in FIGS. 1-3, described above. In step 302, a user may press the cover by hand against an opening to a first chamber of a first fuel filtration housing. In some embodiments, pressing the cover by hand against the opening of the first fuel filtration housing may cause the first seal to engage one or more surfaces of the first fuel filtration housing. For example, the first seal may be sized and shaped to match a size and shape of the opening of the first fuel filtration housing. In step 304, the pump may be operated while the cover is pressed by hand against the opening of the first fuel filtration housing. In this manner, a first low pressure zone may be formed within the first chamber. In some embodiments, forming the first low pressure zone within the first chamber may cause a first liquid within a first supply tank to flow into the first chamber. In some embodiments, the first liquid may be fuel.

Optionally, the same device used to fill a first fuel filtration housing according to steps 302 and 304 may also be used to fill a second fuel filtration housing according to optional steps 306, 308, and 310. In step 306, the cover may be removed from the first filtration housing. In step 308, the cover may then be pressed by hand against an opening to a second chamber of a second fuel filtration housing. In some embodiments, this may cause a second seal coupled to the cover to engage one or more surfaces of the second fuel filtration housing. In step 310, the pump may be operated while the cover is pressed by hand against the opening of the second fuel filtration housing. In this manner, a second low pressure zone may be formed within the second chamber. In some embodiments, forming the second low pressure zone within the second chamber may cause a second liquid within a second supply tank to flow into the second chamber. In some embodiments, the second liquid may be fuel.

In some embodiments, the opening of the second fuel filtration housing may have a different size or shape than the opening of the first fuel filtration housing. In some embodiments, the opening of the second fuel filtration housing may be smaller than the opening of the first fuel filtration housing, but the two openings may otherwise have the same shape. For example, boats often have two or more engines with filtration housings that are made by the same manufacturer and have the same shape but are sized differently. For example, an engine used to propel the boat may have a larger filtration housing and an engine used to generate electricity may have a smaller filtration housing. The two seals on provided on the cover may be sized and shaped to match larger and smaller filtration housings made by a single manufacturer. For example, the two seals may be circles of different sizes or squares of different sizes.

In some embodiments, the cover may be at least partially transparent, allowing a user to look though the cover to see a fill level while the cover is pressed against the opening. In this manner, the user may determine when the chamber is full without removing the cover. In response to determining that the chamber is full, the user may cease operation of the pump and remove the cover from the filtration housing.

In some embodiments, the device may include an overflow reservoir that receives excess fuel in the event that the user inadvertently fills the chamber to the point that it overflows. As described above, operating the pump may cause air to flow out of the pump through an overflow reservoir, and in cases where liquid overflows the chamber of the filtration housing, liquid may be pulled through the input conduit, through the pump and into the overflow reservoir. In some embodiments, the overflow reservoir may have a first port that is pneumatically coupled to the pump and a second port that is open to atmosphere. In some embodiments, the cover may be pressed against an opening of a fuel filtration housing that is disposed in a plane perpendicular to gravity, and the pump may be operated until liquid overflows through the pump and into the overflow reservoir. Due to the arrangement of the second port on the overflow reservoir, at least half of an internal volume of the reservoir may be filled before the liquid overflows through the second port.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for filling a fuel filtration housing, the system comprising:
   a cover, the cover being sized and shaped to releasably engage an opening to a first chamber of a first fuel filtration housing, the cover comprising a hole therethrough such that air may pass from a first side of the cover through the hole to a second side of the cover opposite the first side;
   a first seal coupled to the cover, the first seal being arranged such that when the cover is pressed against the opening of the first fuel filtration housing, the first seal engages one or more surfaces of the first fuel filtration housing;
   a pump, the pump being pneumatically coupled to the hole in the cover; and
   a second seal coupled to the cover, the second seal being arranged such that when the cover is pressed against an opening to a second chamber of a second fuel filtration housing having a size or shape that is different than the opening of the first fuel filtration housing, the second seal engages one or more surfaces of the second fuel filtration housing;
   wherein the cover, the first seal, and the pump are arranged such that when the cover is pressed against the opening of the first fuel filtration housing and the pump is operated, the first seal engages one or more surfaces of the first fuel filtration housing and a first low pressure zone is formed within the chamber of the first filtration housing, the first low pressure zone having a pressure that is lower than a pressure within a first fuel supply tank coupled to the first chamber such that a first liquid within the first supply tank is caused to flow into the first chamber; and
   wherein the cover, second seal, and pump are arranged such that when the cover is pressed against the opening of the second fuel filtration housing and the pump is operated, the second seal engages the one or more surfaces of the second fuel filtration housing and a second low pressure zone is formed within the chamber of the second filtration housing, the second low pressure zone having a pressure that is lower than a pressure within a second fuel supply tank coupled to the second chamber such that a second liquid within the second supply tank is caused to flow into the second chamber.

2. The system of claim 1, wherein the first seal and the second seal are disposed in a common plane, and the second seal is circumscribed by the first seal.

3. The system of claim 2, further wherein:
   a first interior area defined by the first seal has a first centroid;
   a second interior area defined by the second seal has a second centroid, the first and second centroids being located at different positions; and
   the hole in the cover is closer to the second centroid than the first centroid.

4. The system of claim 1, further wherein:
   the cover comprises a planar surface having a first groove and a second groove;
   the first seal is at least partially disposed within the first groove; and
   the second seal is at least partially disposed within the second groove.

5. The system of claim 1, wherein the cover is at least partially transparent such that when the cover is pressed against the opening of the first fuel filtration housing and the first seal engages the one or more surfaces of the first fuel filtration housing, a fill level of the first liquid within the first chamber can be seen by looking through the cover.

6. The system of claim 1, further comprising an overflow reservoir, the overflow reservoir being arranged to receive liquid output from the pump.

7. The system of claim 6, wherein the overflow reservoir has a first port that is pneumatically coupled to the pump and a second port that is open to atmosphere;
   wherein the second port is disposed on the overflow reservoir such that when the cover is pressed against the opening of the first fuel filtration housing—the opening being disposed in a plane perpendicular to gravity—and the pump is operated such that the first liquid fills the first chamber and flows through the hole in the cover, through the pump, and into the overflow reservoir, at least half of an internal volume of the reservoir will be filled with the first liquid before the first liquid overflows through the second port.

8. The system of claim 1, wherein the pump is mechanically coupled to the cover via (i) a pneumatic coupling at the hole in the cover, the hole being disposed at a first end of the cover; and (ii) a mounting stand, the mounting stand being disposed at a second end of the cover opposite the first end.

9. The system of claim 1, wherein the system is no longer than two feet in any dimension and weighs less than five pounds.

10. A method for filling at least one fuel filtration housing, the method being performed using a device comprising a cover, a first seal coupled to the cover, and a pump pneumatically coupled to a hole in the cover, the method comprising:
   pressing the cover by hand against an opening to a first chamber of a first fuel filtration housing, wherein pressing the cover by hand against the opening of the first fuel filtration housing causes the first seal to engage one or more surfaces of the first fuel filtration housing;
   operating the pump while the cover is pressed by hand against the opening of the first fuel filtration housing, thereby forming a first low pressure zone within the first chamber, wherein forming the first low pressure zone within the first chamber causes a first liquid within a first supply tank to flow into the first chamber;
   removing the cover from the first filtration housing;
   pressing the cover by hand against an opening to a second chamber of a second fuel filtration housing, the opening of the second fuel filtration housing having a different size or shape than the opening of the first fuel filtration housing, wherein pressing the cover by hand against the opening of second fuel filtration housing causes a second seal that is coupled to the cover to engage one or more surfaces of the second fuel filtration housing;
   operating the pump while the cover is pressed by hand against the opening of the second fuel filtration housing, thereby forming a second low pressure zone within the second chamber;
   wherein forming the second low pressure zone within the second chamber causes a second liquid within a second supply tank to flow into the second chamber.

11. The method of claim 10, wherein the first seal and the second seal are disposed in a common plane, and the second seal is circumscribed by the first seal.

12. The method of claim 11, further wherein:
   a first interior area defined by the first seal has a first centroid;
   a second interior area defined by the second seal has a second centroid, the first and second centroids being located at different positions; and
   the hole in the cover is closer to the second centroid than the first centroid.

13. The method of claim 10, further wherein:
   the cover comprises a planar surface having a first groove and a second groove;
   the first seal is at least partially disposed within the first groove; and
   the second seal is at least partially disposed within the second groove.

14. The method of claim 11, wherein the cover is at least partially transparent, the method further comprising:
   looking though the cover while the cover is pressed against the opening of the first fuel filtration housing to see a fill level of the first liquid within the first chamber;
   determining that the first chamber is full;
   in response to determining that the first chamber is full, ceasing operation of the pump.

15. The method of claim 10, wherein operating the pump causes air to flow out of the pump through an overflow reservoir, the overflow reservoir being arranged to receive liquid output from the pump.

16. The method of claim 15, wherein the overflow reservoir has a first port that is pneumatically coupled to the pump and a second port that is open to atmosphere, and the opening of the first fuel filtration housing is disposed in a plane perpendicular to gravity, the method further comprising:
   operating the pump until the first liquid fills the first chamber and flows through the hole in the cover, through the pump, and into the overflow reservoir;
   wherein the second port is arranged on the overflow reservoir such that at least half of an internal volume of the reservoir must be filled with the first liquid before the first liquid overflows through the second port.

17. The method of claim 10, wherein the pump is mechanically coupled to the cover via (i) a pneumatic coupling at the hole in the cover, the hole being disposed at a first end of the cover; and (ii) a mounting stand, the mounting stand being disposed at a second end of the cover opposite the first end.

18. The method of claim 10, wherein the device is no longer than two feet in any dimension and weighs less than five pounds.

* * * * *